Jan. 30, 1951 J. L. CLAGHORN 2,539,726
TRAY
Filed April 28, 1947 2 Sheets-Sheet 1
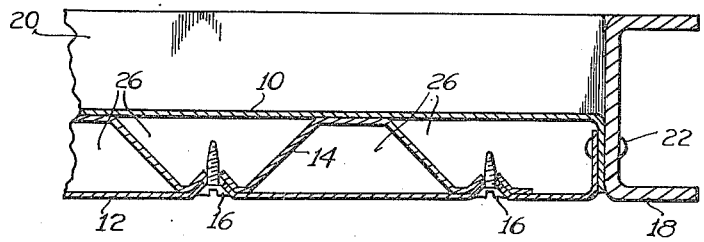
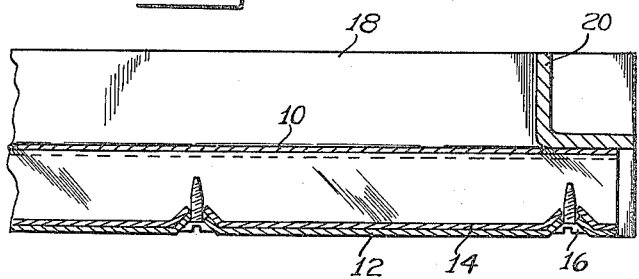
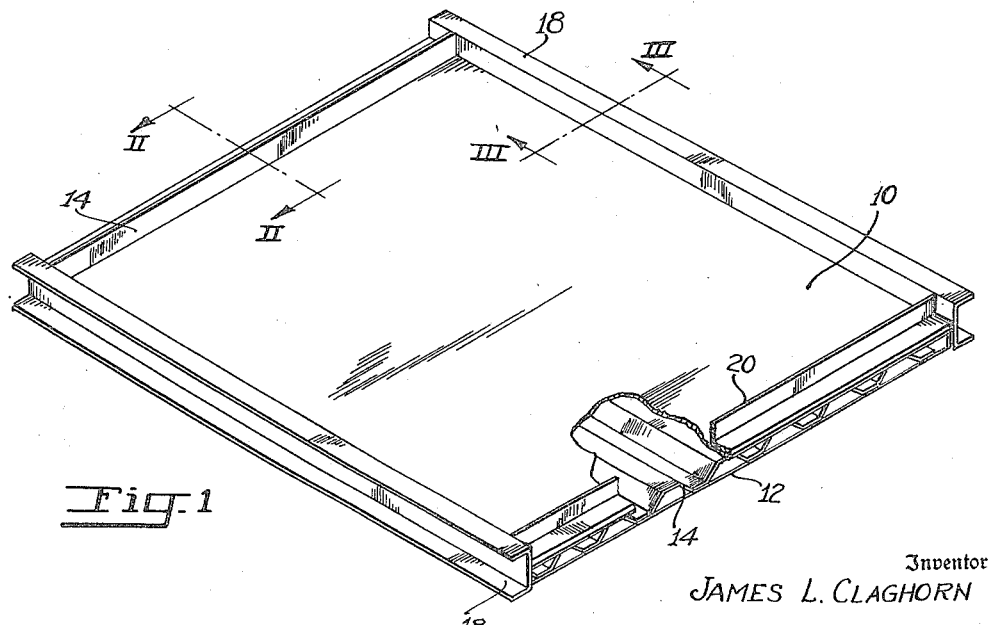
Inventor
JAMES L. CLAGHORN
By Reynolds & Beach
Attorneys Jan. 30, 1951      J. L. CLAGHORN      2,539,726
TRAY Filed April 28, 1947      2 Sheets-Sheet 2

Inventor
JAMES L. CLAGHORN
By Reynolds & Beach
Attorneys

Patented Jan. 30, 1951

2,539,726

UNITED STATES PATENT OFFICE 2,539,726

TRAY

James L. Claghorn, Seattle, Wash., assignor to North Pacific Frozen Products Co., Seattle, Wash., a corporation of Washington Application April 28, 1947, Serial No. 744,422

1 Claim. (Cl. 62—1)

This invention relates to cooling trays such as may be used in stacking layers of foodstuffs in a refrigeration space for quick freezing purposes. An object of the invention is to provide improved supporting means for foodstuffs, and the like, to be positioned in layers in stacked relation, for quick-freezing purposes.

A further object of the invention is to provide a refrigerator tray of sturdy and simple construction, adapted for use in numbers for supporting layers of foodstuffs, in stacked relation, with spaces provided between layers for the passage therethrough of a refrigeration fluid, such as cold air, for the purpose of refrigerating all food articles quickly and with uniformity throughout the stack. Still another object is to provide an article supporting member having internal ducts passing therethrough, which is of light and sturdy construction and easily handled.

A favorite method of preserving foodstuffs and other perishables over a long period of time is to freeze them quickly at low temperatures and then place them in a cold storage room maintained at a temperature somewhat below the freezing point. This method is particularly desirable in preserving food fishes, either whole or as fillets, where the fish is first frozen solid by a quick-free process and then stored in the cold storage room. Only during the initial freezing step are extremely low temperatures used, and this may be carried out in a relatively small apparatus and space, involving only a small cost. Once the food has been frozen solid and placed in the storage plant the temperature can be raised and held at a level only relatively slightly below the freezing point, without danger of deterioration, thereby minimizing the cost of construction and operation of the storage plant. However, in passing the food through the quick-freezing stage it is desirable to minimize the time expended in carrying out that operation, while insuring that all of the food articles are treated alike. In keeping with this, the present invention provides a foodstuff supporting member or tray, which may be used in numbers in forming a stack of foodstuff layers, one tray directly upon the other while inherently providing ducts between the foodstuff layers to convey a refrigerating medium.

Preferably the articles to be treated are placed under pressure during freezing to facilitate the exchange of heat to the refrigeration fluid from the articles through the walls of the supporting members and to promote rapid and uniform freezing of the food product. In utilizing article-supporting means such as described herein for that purpose, the upper surface of an article layer within a tray is allowed to project initially upwardly beyond the upper supporting edge of the tray, so that the weight of superimposed supporting members and their individual food layers and any pressure which may be applied to the stack of trays as a whole, will compress the foodstuff layers somewhat while in the trays.

The foregoing and other objects of the invention, including various novel features thereof, will now become apparent from the following description based on the accompanying drawings.

Figure 1 is a perspective view of a refrigerator tray of a type contemplated by the invention, while Figure 2 is a fragmentary sectional view taken along the line II—II of Figure 1, and Figure 3 is a fragmentary sectional view taken along the line III—III of Figure 1.

Figure 4 is an end elevation view illustrating the manner of stacking trays of the Figure 1 construction, while

Figure 7:
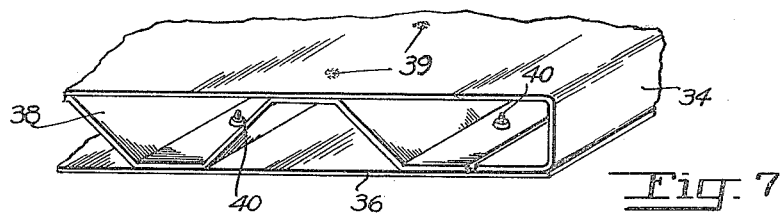
Figure 7 is a partial perspective view of a modified article supporting member intended for use in stacking article layers in a different manner.

In Figures 1 to 3, inclusive, the tray shown comprises a pair of plates 10 and 12 maintained in superposed spaced relation by an intervening duct-forming trusswork shown in the form of a corrugated sheet 14 extending substantially throughout the space between the plates. Alternatively the corrugations may comprise sinuous curves of various shapes, or angular sections, as desired, the latter being preferred. Opposite convolute surfaces of the corrugated sheet are disposed in contacting relation to the inner surfaces of the plates 10 and 12, respectively, and in the preferred construction the upper contacting surfaces of the truss sheet are spot welded to the upper plate 10, and the lower contacting surfaces of the corrugated sheet and the lower plate are held together by suitable securing means such as screws 16. Conveniently the screws are fastened in place by their threaded engagement with the upturned lower edges of congruent screw holes formed respectively in the sheet 14 and the plate 12.

Side members 18, of channel cross section, joined by the bottom plates 10 and 12 serve to increase the rigidity of the tray and to provide a convenient construction by which trays may be supported one on top of the other with a predetermined minimum vertical space provided in each tray for occupation by a layer of foodstuff contained within the tray. The use of channel members in this capacity has other purposes as well, including convenience in handling, guiding a tray to be inserted in a laterally restricted space, and forming a side cooling duct in cases where the tray abuts the cooling compartment wall or another tray. Completing the tray construction, wall members 20 are employed, comprising rightangle pieces extending between the channel members 18 and resting against the plate 10. The wall members 18 and 20 may be welded together at the corners and the tray supporting portion, comprising the plates 10 and 12 and the intervening corrugated sheet 14, may be riveted to the members 18 as shown at 22, at spaced points along the length thereof.

The screws 16 are shown countersunk to avoid protuberances which would catch on the layer beneath in inserting or removing a tray, or prevent firm contact of the tray bottom with such layer and, as a further refinement, the screw heads may be wiped with solder or other filler metal to provide a still smoother surface. All layer contacting surfaces are preferably flat and smooth to insure uniform transfer of heat from the food to the refrigeration fluid through such surfaces. Moreover, if the foodstuff is packed in cardboard cartons, as it may be, any irregularities in the tray surfaces engaging it would leave an undesirable imprint on the carton.

Figure 4:
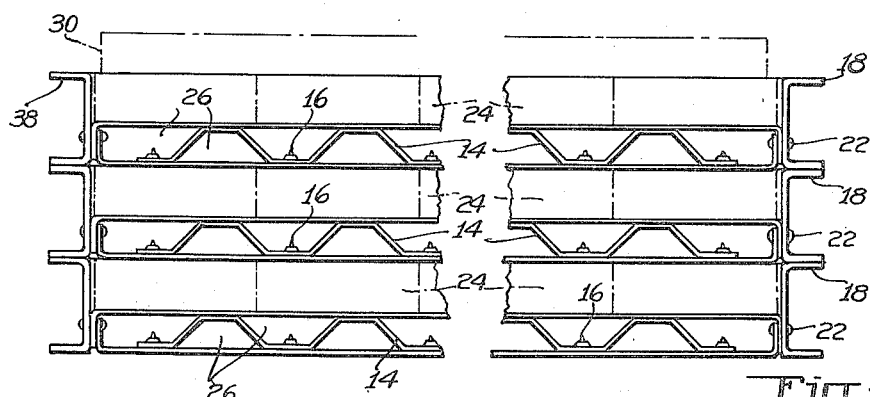

Thus, as may be seen from Figure 4, and from other figures, ducts 26 are formed between layers of foodstuff to be frozen, through which cold air or other refrigerants may pass, and the desired compression of the articles in gaining good surface to surface contact with the tray surfaces, may be achieved by allowing the upper layer surfaces to project somewhat above the upper edge of the tray, as indicated by the spaces 28 (Figure 5) between superposed adjacent flanges of the channel members. The weight of overlying trays and layers of foodstuffs, when combined with a hold-down weight 30 (Figure 4), will then serve to compress the layers before bringing the opposing channel members into contact. Such pressure will compact the packages or articles to uniform size and shape to facilitate storage after freezing.

Figures 5, 6:
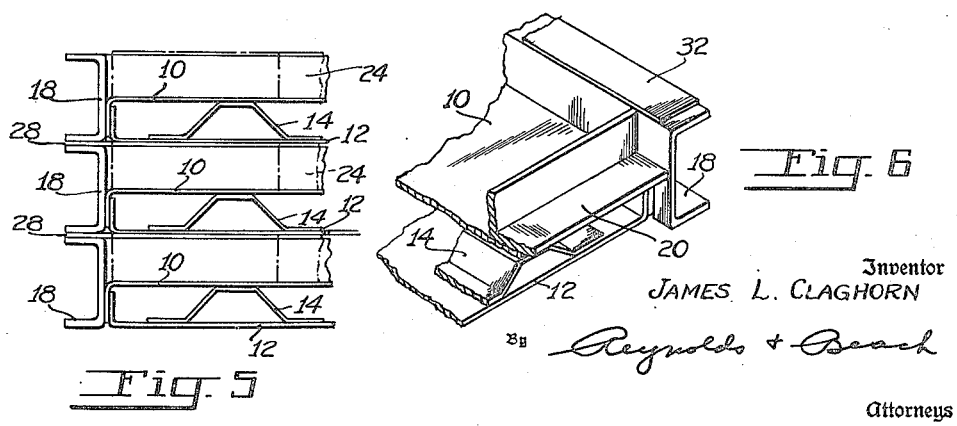
Figure 5 is a partial end view of trays stacked in the manner of Figure 4, in which is illustrated the method by which pressure is applied to the article layers to expedite uniform cooling thereof.
Figure 6 is a fragmentary top perspective view illustrating the use of shims or spacer strips placed between trays of the Figure 1 construction, as compensation in vertical spacing, where the article layers differ in thickness from a standard or predetermined size.

To allow for differences in height or thickness of articles to be frozen, shims or spacer members may be laid on top of the upper flanges of the side members 18, as indicated at 32 in Figure 6, to maintain the desired spatial relationship described in connection with Figure 5. By this expedient the degree of compression of the food products or packages is limited so that they will not be injured, while enabling the trays to be converted readily for accommodating products of different initial thickness.

Figure 8:
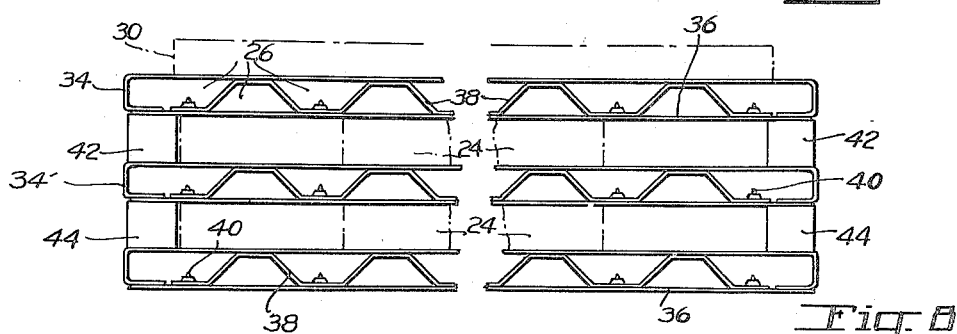
Figure 8 is an end elevation view of a stack of such members illustrating the manner in which this is done.

In some instances, especially where the food is nicely packaged and easily handled, the use of a tray of the more elaborate Figure 1 construction may be replaced by an alternative supporting member or platform such as that shown in Figure 7. Such a member, being similar to the bottom construction of the tray of Figure 1, just described, comprises a tubular sleeve formed of a plate 34 having sides which have been bent downwardly and inwardly to join a bottom plate 36 extending the inturned flanges of the upper sheet thus formed. Between the facing surfaces of the plate 34 and of the bottom plate 36 is disposed a duct-forming corrugated sheet 38 forming a trusswork. The upper elements of this intermediate sheet are spot welded at 39 to the upper sheet 34, and the lower elements of the intermediate sheet may be secured to the bottom plate 36 by means of screws 40, as in the Figure 1 construction. In the use of such a member in building a stack of individual layers, pairs of spacer blocks 42 and 44 may be placed along opposite edges of the plaforms between superposed platforms as shown in Figure 8. These spacer blocks are slightly narrower than the thickness of the food products or packages. In this way the desired compression of the foodstuff layers may be readily determined, as before.

I claim as my invention:

An article-supporting tray comprising parallel channels disposed in parallel, spaced relationship and having top and bottom marginal flanges projecting outward, two angle members narrower than said channels, disposed in parallel relationship perpendicular to said channels and joining corresponding ends thereof, respectively, adjacent to the said top marginal flanges of said channels, an upper plate extending between said channels intermediate to their flanges and secured to the lower edges of said angle members, a lower plate secured to the lower edges of said channels, and a corrugated spacer sheet extending generally parallel to said plates and bridging the space therebetween to support the central portion of said upper plate from said lower plate, and to define multiple parallel ducts between and parallel to said plates.

JAMES L. CLAGHORN.

REFERENCES CITED

The following references are of record in the file of this patent:

UNITED STATES PATENTS

| Number | Name | Date |
| --- | --- | --- |
| 1,247,250 | Field | Nov. 20, 1917 |
| 1,601,637 | Meigs | Sept. 28, 1926 |
| 1,614,455 | Cooke | Jan. 18, 1927 |
| 1,953,626 | Nash | Apr. 3, 1934 |
| 2,063,646 | Whitesel | Dec. 8, 1936 |
| 2,257,377 | Haben | Sept. 30, 1941 |
| 2,435,642 | Patterson | Feb. 3, 1948 |
| 2,487,584 | Patterson | Nov. 8, 1949 |

FOREIGN PATENTS

| Number | Country | Date |
| --- | --- | --- |
| 230,132 | Great Britain | Mar. 2, 1925 |